: US008915126B2

United States Patent
Friedmann et al.

(10) Patent No.: US 8,915,126 B2
(45) Date of Patent: Dec. 23, 2014

(54) DEVICE FOR TESTING FUEL INJECTORS, AND CORRESPONDING METHOD

(75) Inventors: Jochen Friedmann, Kirchheim (DE); Joachim Goeser, Donzdorf (DE); Karl-Martin Kutteruf, Neidlingen (DE); Markus Vogel, Albershausen (DE)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 13/699,383

(22) PCT Filed: Apr. 13, 2011

(86) PCT No.: PCT/EP2011/055818
§ 371 (c)(1),
(2), (4) Date: Feb. 5, 2013

(87) PCT Pub. No.: WO2011/151097
PCT Pub. Date: Dec. 8, 2011

(65) Prior Publication Data
US 2013/0139579 A1 Jun. 6, 2013

(30) Foreign Application Priority Data

May 31, 2010 (DE) .......................... 10 2010 029 493

(51) Int. Cl.
*G01M 15/04* (2006.01)
*F02D 41/26* (2006.01)
*F02D 41/20* (2006.01)
*F02D 41/22* (2006.01)
*F02M 65/00* (2006.01)

(52) U.S. Cl.
CPC ............. *G01M 15/04* (2013.01); *F02D 41/266* (2013.01); *F02D 41/2096* (2013.01); *F02D 2400/22* (2013.01); *F02M 2200/21* (2013.01); *F02D 41/221* (2013.01); *F02M 65/00* (2013.01)
USPC ...................................................... 73/114.45

(58) Field of Classification Search
CPC ............. F02D 41/2096; F02D 41/221; F02D 2400/22; F02M 65/00; F02M 2200/21; G01M 15/04
USPC ....................................................... 73/114.45
See application file for complete search history.

(56) References Cited

U.S. PATENT DOCUMENTS

| 4,523,458 | A  | * | 6/1985  | Daniel ........................ 73/114.45 |
| 6,918,379 | B2 | * | 7/2005  | Reischl et al. ................. 123/480 |
| 7,467,543 | B2 | * | 12/2008 | Schoor et al. .............. 73/114.45 |

(Continued)

FOREIGN PATENT DOCUMENTS

| CN | 101228344 | 7/2008 |
| CN | 101639015 | 2/2010 |
| DE | 10 2007 038 537 | 2/2009 |
| DE | 10 2008 004278 | 7/2009 |

(Continued)

*Primary Examiner* — Freddie Kirkland, III
(74) *Attorney, Agent, or Firm* — Kenyon & Kenyon LLP

(57) ABSTRACT

A device and a method for testing fuel injectors, in particular, of the piezo type. The device includes at least one, in particular, bidirectional interface for connecting an operator control unit, at least one outlet for connecting at least one fuel injector, at least one integrated circuit, as well as a microcontroller for controlling the integrated circuit, the integrated circuit and the microcontroller cooperating in a way that allows the fuel injector to be tested as a function of the type and/or subtype thereof, including at least the piezo type having the subtypes active high and active low.

10 Claims, 1 Drawing Sheet

(56) References Cited

U.S. PATENT DOCUMENTS

| | | | |
|---|---|---|---|
| 7,533,563 B2 * | 5/2009 | Horak | 73/114.45 |
| 8,061,188 B2 * | 11/2011 | Hoffmann et al. | 73/114.45 |
| 8,635,985 B2 * | 1/2014 | McAlister | 123/297 |
| 2007/0001545 A1 * | 1/2007 | Schoor et al. | 310/317 |
| 2008/0319699 A1 * | 12/2008 | Perryman | 702/115 |

FOREIGN PATENT DOCUMENTS

| | | | |
|---|---|---|---|
| DE | 102008004278 | * | 7/2011 |
| EP | 1 746 277 | | 1/2007 |
| EP | 1746277 A2 | * | 1/2007 |
| GB | 2 393 217 | | 3/2004 |
| GB | 2 425 571 | | 11/2006 |

* cited by examiner

DEVICE FOR TESTING FUEL INJECTORS, AND CORRESPONDING METHOD

FIELD OF THE INVENTION

The present invention relates to a device for testing fuel injectors, in particular, of the piezo type, as well as to a corresponding method for testing fuel injectors.

BACKGROUND INFORMATION

Fuel injectors are used, for example, in fuel injection systems in motor vehicles. To be able to test these during manufacture thereof or also subsequently in a repair shop, specially adapted test devices are used that are specifically adapted to each particular fuel injector type. For many special types of fuel injectors, for example, piezo fuel injectors of the subtype "active low," thus piezo fuel injectors, where an injection valve is closed in the presence of an operating voltage (fuel injection into a cylinder is interrupted), testing is only possible, if at all, during manufacturing and only of individual components of the corresponding fuel injector. Known methods provide for testing of a fuel injector following the manufacture thereof.

The German Patent Application DE 10 2007 038 537 A1 discusses a test device and a method for testing an actuator of a fuel injector, the fuel injector being a piezo fuel injector. A test voltage is applied in steps or steplessly to the fuel injector, and a detected variation in a characteristic of an electrical quantity of a total resistance of the fuel injector ensuing during the change in the test voltage is measured.

SUMMARY OF THE INVENTION

The device defined herein for testing fuel injectors, in particular, of the piezo type, includes at least one, in particular, bidirectional interface for connecting an operator control unit, at least one outlet for connecting at least one fuel injector, at least one integrated circuit, as well as a microcontroller for controlling the integrated circuit, the integrated circuit and the microcontroller cooperating in a way that allows the fuel injector to be tested as a function of the type and/or subtype thereof, including at least the piezo type having the subtypes active high and active low.

In this Specification, piezo fuel injectors, whose injection valve is closed in response to the presence of an operating voltage (fuel injection into a cylinder is interrupted), are described as "active low." In this Specification, piezo fuel injectors, which have an injection valve that is open in response to the presence of an operating voltage (fuel injection into a cylinder is carried out), are described as "active high."

The method defined herein for testing fuel injectors, in particular, of the piezo type, suited, in particular, for implementation on a device in accordance with the descriptions herein, includes the steps of: connecting a fuel injector for testing thereof to a device for testing, identifying the type and/or subtype of the fuel injector, including at least the subtypes active high and active low, testing the fuel injector in accordance with the type and/or subtype thereof, providing a result of the tested fuel injector.

The device defined herein for testing fuel injectors, as well as the corresponding method defined herein advantageously allow a cost-effective testing of a plurality of fuel injectors. At the same time, the space requirements for such a device are altogether reduced, since this device eliminates the need for any additional devices for each individual fuel injector type, respectively subtype. Finally, the implementation or execution of the fuel injector test is simplified because an operator merely needs to operate one single device, respectively implement one method for different types and subtypes of fuel injectors. The wiring outlay for connecting the various fuel injectors is likewise lowered.

In accordance with another advantageous embodiment of the present invention, the outlet for connecting a mechanically and/or electrically encoded plug of a line is configured for a fuel injector. Here, the advantage is derived that, on the one hand, the type, respectively subtype of the fuel injector may be reliably and uniquely identified, and, on the other hand, the connected fuel injector type, respectively subtype may be simply and readily identified in that the outlet is configured accordingly, for example, to include suitable contacts that engage in corresponding contacts of the plug.

In another advantageous embodiment of the present invention, the outlet cooperates with the microcontroller and/or the integrated circuit to allow automatic identification of the type and/or subtype of the fuel injector. Here, the advantage is derived that the connected fuel injector type, respectively subtype is recognized without any further external intervention, for example, by a corresponding changeover switch, etc., thereby allowing the microcontroller and/or the integrated circuits to subsequently immediately begin testing the connected fuel injector. A testing of a fuel injector is thus simplified and accelerated.

Another advantageous embodiment of the present invention provides that the integrated circuit include a charging and a discharging circuit. Here, the advantage is derived that piezo-type fuel injectors having the subtypes active high and active low may be tested by the device simply and reliably.

Another advantageous embodiment of the present invention provides that the charging and discharging circuit be configured for a plurality of charging and discharging operations and, in particular, include a buffer capacitor. Here, the advantage is derived that the charging of a piezo fuel injector may be carried out from the buffer capacitor, and, upon discharging of the same, the charge may be directly returned to the buffer capacitor. The buffer capacitor is provided with a capacitance that is significantly higher than that of the piezo fuel injector, in particular, to allow a plurality of charging and discharging operations.

In accordance with another advantageous embodiment of the present invention, the integrated circuit includes a DC-DC converter. Here, the advantage is derived that a voltage across the buffer capacitor may be increased simply and reliably, enabling the buffer capacitor to be rapidly charged and be thereby available for testing fuel injectors.

In accordance with another advantageous embodiment of the present invention, an arrangement is provided for measuring the fuel injector insulation. Here the advantage is derived that the insulation resistance of an actuator of the fuel injector, and thus of the fuel injector may be evaluated simply, cost-effectively and reliably. If, for example, the measured value of the insulation resistance of the fuel injector actuator resides outside of a predefined tolerance range, the fuel injector may be directly separated out and does not need to be additionally tested by the corresponding actuation thereof.

In accordance with another advantageous embodiment of the present invention, an arrangement is provided for testing the fuel injector for leakage. Here the advantage is derived that even fuel injectors having solenoid valves may be tested for leakage, in particular. This enhances the flexibility of the devices, respectively of the method. The leakage test measures a leakage of the fuel injector in the actuated and unactuated state. If leakage occurs during the unactuated phase, the fuel injector is leaky and is replaced.

In another advantageous embodiment of the method, a mechanical and/or electrical encoding is used for identifying the type and/or subtype of the fuel injector. Here, the advantage is derived that the particular type and/or subtype of the fuel injector may be simply and cost-effectively identified.

Exemplary embodiments of the present invention are illustrated in the drawing and are explained in detail in the following description.

DETAILED DESCRIPTION

Figure 1:
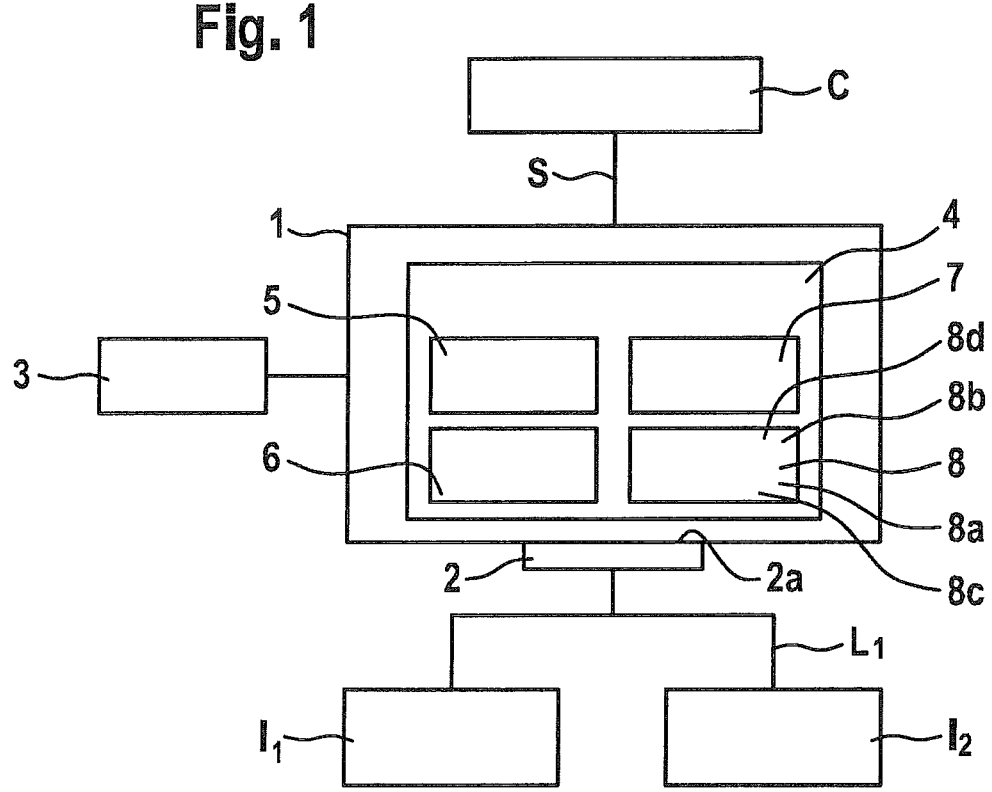
FIG. 1 shows a device for testing fuel injectors in accordance with a first specific embodiment of the present invention.

FIG. 1 shows a device for testing fuel injectors in a first specific embodiment of the present invention.

In FIG. 1, reference numeral 1 denotes a device for testing piezo fuel injectors. To begin with, an operator control unit in the form of a computer C is connected to device 1 via a bidirectional interface S. Also connected thereto is an energy source 3 for operating device 1. In addition, device 1 includes an outlet 2a that is configured for connecting a mechanically and electrically encoded plug 2 of a line $L_1$ for two fuel injectors $I_1$, $I_2$. Plug 2 and corresponding connection 2a to line $L_1$ may be used for connection of fuel injectors $I_1$, $I_2$ of the piezo type and/or the solenoid type. Connection 21 cooperates with a test module 6, which directly identifies the corresponding mechanical and electrical encoding of plug 2 and cooperates with a microcontroller 5, allowing an integrated circuit 8 for testing connected fuel injector $I_1$, $I_2$ to be controlled in accordance with the identified type and subtype of fuel injector $I_1$, $I_2$. Moreover, device 1 includes an actuator test module 7 which is used for testing an actuator of fuel injector $I_1$, $I_2$ with regard to phase breakdown. Actuator test module 7 tests an internal resistance of connected piezo fuel injector $I_1$, $I_2$. On the basis of the values of the internal resistance of piezo fuel injector $I_1$, $I_2$ ascertained in the testing by actuator test module 7, it is decided whether piezo fuel injector $I_1$, $I_2$ is damaged.

Microcontroller 5, test module 6, actuator test module 7, as well as integrated circuit 8 are configured within test device 1 on a shared circuit board 4. Integrated circuit 8 also includes a testing arrangement 8a for testing solenoid valves for leakage, a determining arrangement 8b for determining the quality of piezo fuel injectors, a measuring arrangement 8c for measuring the insulation of piezo fuel injectors, as well as a corresponding charging and discharging circuit 8d for testing piezo fuel injectors $I_1$, $I_2$.

Microcontroller 5 is used for generating various control characteristics for fuel injectors $I_1$, $I_2$ of different types and subtypes. At the same time, it also includes a converting arrangement for converting digital signals into analog current waveforms for the particular fuel injectors $I_1$, $I_2$. The result of a test of a fuel injector $I_1$, $I_2$ connected to device 1 is transmitted by device 1 via interface S to computer C. Via interface S, information is also made available to generate control characteristics for fuel injector(s) $I_1$, $I_2$ connected in each case to device 1. At the same time, diagnostic and error messages of device 1 may also be displayed. The communication between device 1 and computer C may be based on text protocol via RS232, for example.

Figure 2:
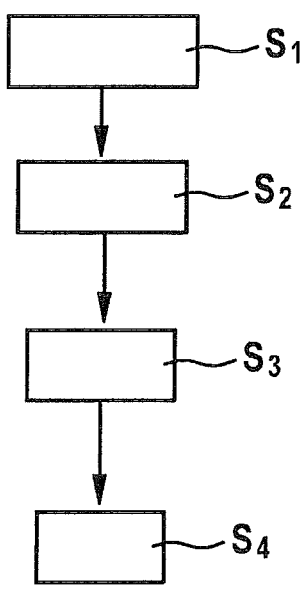
FIG. 2 shows a flow chart of a method in accordance with the first specific embodiment of the present invention.

FIG. 2 shows a flow chart of a method in accordance with the first specific embodiment of the present invention.

In FIG. 2, reference numeral $S_1$ denotes a connection of a fuel injector to be tested, to a device 1. An identification $S_2$ of the type and/or subtype of fuel injector $I_1$, $I_2$ follows, including at least the subtypes active high and active low. In a subsequent step, a testing $S_3$ of fuel injector $I_1$, $I_2$ is performed in accordance with the type and/or subtype of fuel injector $I_1$, $I_2$ and, in a further step S4, a result of tested fuel injector $I_1$, $I_2$ is provided.

Although the present invention was described above on the basis of exemplary embodiments, it is not limited thereto and may be modified in numerous ways.

What is claimed is:

1. A device for testing a fuel injector, which is a piezo-type, comprising:
    at least one bidirectional interface for connecting an operator control unit;
    at least one outlet for connecting at least one fuel injector; and
    at least one integrated circuit having a microcontroller for controlling the integrated circuit, wherein the integrated circuit and the microcontroller cooperate so that the fuel injector is tested as a function of the type or subtype thereof, including at least the piezo-type subtype having active high and active low;
    wherein the at least one outlet is configured to cooperate with at least one of the microcontroller and the integrated circuit to allow automatic identification of the type or subtype of the fuel injector.

2. The device of claim 1, wherein the outlet for connecting at least one of a mechanically encoded plug and an electrically encoded plug of a line is configured for the fuel injector.

3. The device of claim 1, wherein the integrated circuit includes a charging and discharging circuit.

4. The device of claim 1, wherein the charging and discharging circuit is configured for a plurality of charging and discharging operations, and includes a buffer capacitor.

5. The device of claim 1, wherein the integrated circuit includes a DC-DC converter.

6. The device of claim 1, further comprising:
    an insulation measurement arrangement to measure an insulation of the fuel injector.

7. The device of claim 1, further comprising:
    an leakage testing arrangement to leakage test the fuel injector.

8. The device of claim 1, wherein an insulation measurement arrangement is configured for testing the fuel injector of the piezo-type of the actuator of the fuel injector, including of an internal resistance of the actuator of the fuel injector.

9. A method for testing a fuel injector, which is of the piezo-type, for implementation on a device for testing, the method comprising:
    connecting the fuel injector for testing thereof to the device for testing;
    automatically identifying the type or subtype of the fuel injector, including at least the subtypes of active high and active low;
    testing the fuel injector in accordance with the type or subtype thereof; and
    providing a result of the tested fuel injector;
    wherein the device for testing includes:
    at least one bidirectional interface for connecting an operator control unit;

at least one outlet for connecting at least one fuel injector; and at least one integrated circuit having a microcontroller for controlling the integrated circuit, wherein the integrated circuit and the microcontroller cooperate so that the fuel injector is tested as a function of the type or subtype thereof, including at least the piezo-type subtype having active high and active low.

10. The method of claim 9, wherein at least one of a mechanical encoding and an electrical encoding is used for the identification of the type or subtype of the fuel injector.

\* \* \* \* \*